United States Patent [19]

Ladin

[11] 4,304,412
[45] Dec. 8, 1981

[54] CONTOURED DOUBLE-LIP BEARING SEAL

[75] Inventor: Eli M. Ladin, Ann Arbor, Mich.

[73] Assignee: Federal-Mogul Corporation, Southfield, Mich.

[21] Appl. No.: 90,778

[22] Filed: Nov. 2, 1979

[51] Int. Cl.³ .............................................. F16C 33/78
[52] U.S. Cl. ..................................... 277/94; 277/183; 308/187.2
[58] Field of Search ............... 277/94, 183; 308/187.1, 308/187.2

[56] References Cited

U.S. PATENT DOCUMENTS

| | | | |
|---|---|---|---|
| 3,049,357 | 8/1962 | Kosatka | 277/183 |
| 3,090,628 | 5/1963 | Giuliette | 277/94 |
| 3,145,996 | 8/1964 | Ninos et al. | 277/94 |
| 3,203,740 | 8/1965 | Peickii et al. | 277/94 |
| 3,396,977 | 8/1968 | Iguchi | 277/94 |
| 3,572,857 | 3/1971 | Hasegawa | 308/187.2 |
| 3,642,335 | 2/1972 | Takahashi et al. | 277/94 |
| 3,709,572 | 1/1973 | Pethis | 277/94 |
| 3,792,912 | 2/1974 | Howe et al. | 277/94 |

Primary Examiner—Robert I. Smith
Attorney, Agent, or Firm—William G. Coon

[57] ABSTRACT

A contoured double-lip seal and bearing assembly incorporating at least one such seal in the annular gap between the annular races thereof. The double-lip seal comprises a reinforcing washer in which a mass of fluid resistant resilient material is secured and is integrally formed with a pair of annular axially spaced sealing members. The inner sealing member adapted to be disposed adjacent to the anti-friction elements of the bearing is of an arcuate transverse configuration and terminates in a sealing lip of a frusto-conical configuration which projects axially and radially outwardly of the bearing at an acute angle to the axis of the bearing and is disposed in resilient sliding sealing relationship on a cylindrical section of one of the race members. The outer sealing member also terminates in an outer sealing lip of a frusto-conical configuration projecting axially and radially in the same direction as the inner sealing lip and projects at an acute angle to the surface of a chamfer formed on the outer end portion of the one race member.

11 Claims, 3 Drawing Figures

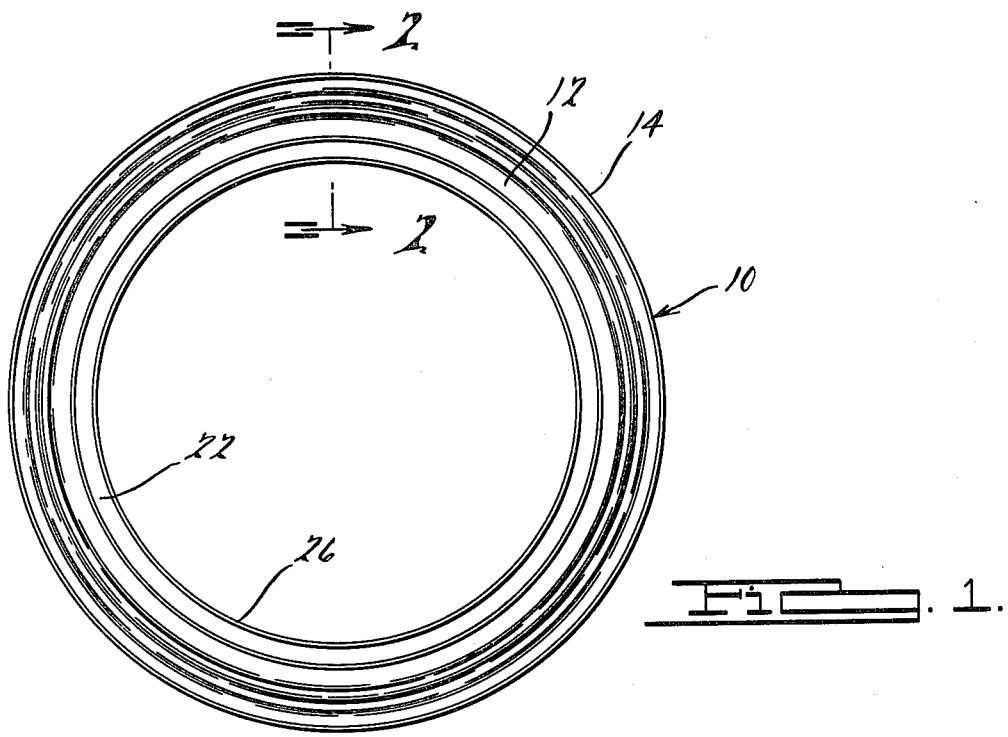
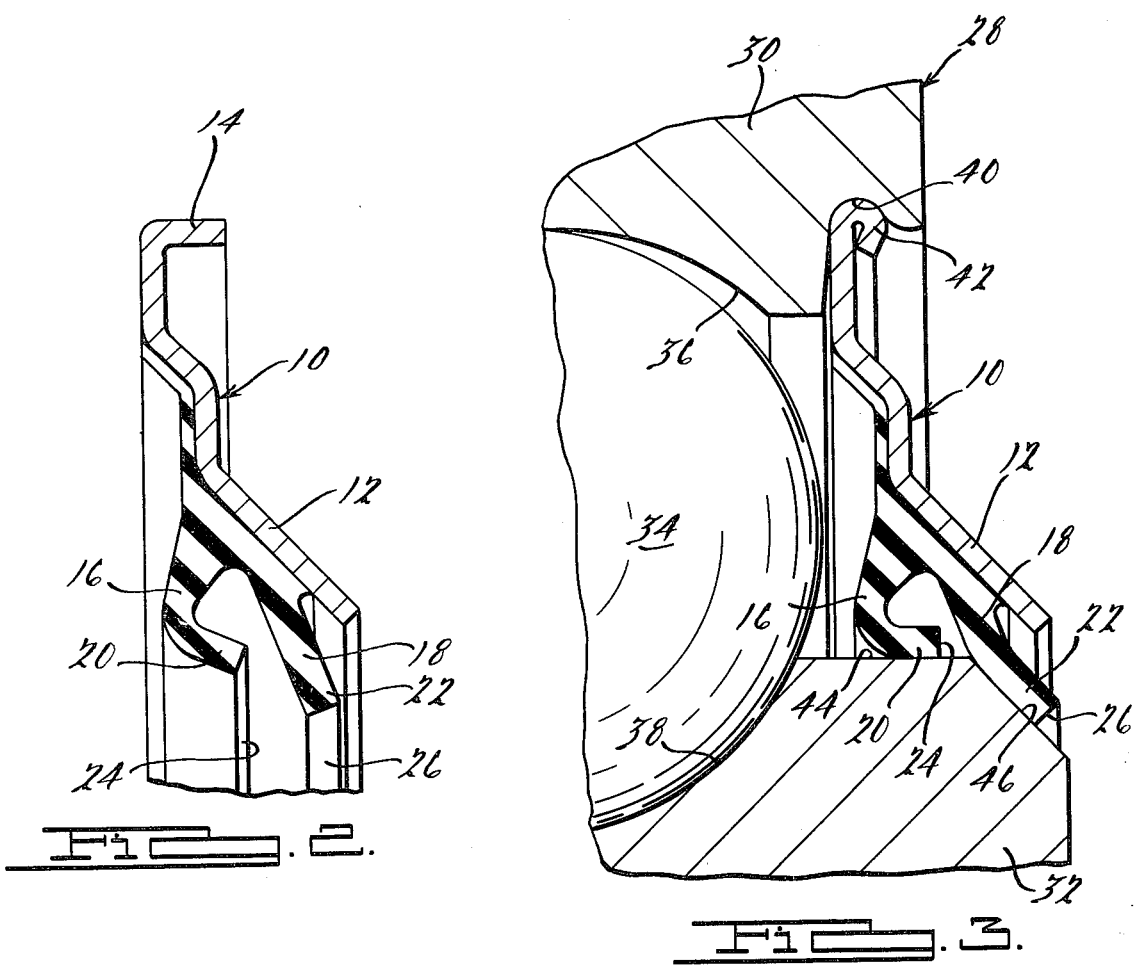

CONTOURED DOUBLE-LIP BEARING SEAL

BACKGROUND OF THE INVENTION

A variety of sealing devices have heretofore been used or proposed for use for sealing bearings of the type comprising a pair of annular race members incorporating a plurality of anti-friction elements such as balls in the raceways thereof to retain lubricant within the bearing and to prevent entry of dirt, water and other extraneous materials into the interior of the bearing. In ball bearing assemblies of the type employed in the wheels of automobiles, the severe service conditions necessitate particularly effective sealing devices to exclude the entry of dirt, water, sand and salt which otherwise might materially reduce the useful operating life of such bearings. It is desirable in wheel bearing assemblies and other bearing assemblies subjected to similar severe operating conditions to provide multiple lip seal assemblies to increase the sealing characteristics and exclusion of undesired extraneous matter.

A continuing problem associated with wheel bearing assemblies, especially ball bearings, and the like has been the lack of sufficient axial clearance between the anti-friction elements and the side edges of the annular race members to accomodate multiple lip sealing devices of the types heretofore known. Because of this, it has been necessary in such instances to employ single-lip seals which provide less than optimum sealing characteristics. A further problem has been in the tendency of the sealing lips of the sealing device to become oriented in a reverse axial direction during installation of the sealing device in the bearing assembly, further detracting from the sealing characteristics thereof. The magnitude of deflection of the annular sealing members in multiple lip sealing devices of the types heretofore known has also been extremely great, causing excessive pressure on the sealing surface, promoting drag and wear of the sealing device with an attendant reduction in its useful operating life.

The problems and disadvantages associated with prior art sealing devices is overcome in accordance with the present invention in which a double-lip seal is provided of compact axial width, enabling its use in bearing assemblies which normally can accomodate only a single-lip seal and wherein the individual sealing lips are contoured and project at an acute angle in the axial direction of their ultimate assembled position, assuring proper orientation thereof during installation and reducing friction and drag of the sealing lips on the bearing surfaces against which they are disposed in resilient sliding contact.

SUMMARY OF THE INVENTION

The benefits and advantages of the present invention are achieved by a double-lip seal adapted to be disposed in the annular gap between a pair of annular race members of a bearing assembly adjacent to the anti-friction elements interposed therebetween. The seal is comprised of an annular reinforcing member which is adapted to be secured along one radial edge thereof to one of the relatively rotatable race members and to which is secured a mass of fluid resistant resilient material integrally formed with a pair of axially spaced annular sealing members. The inner sealing member is formed having a permanent arcuate transverse configuration and terminates in a first sealing lip of a generally frusto-conical configuration, projecting axially and radially at an acute angle to the axis of the bearing. The outer sealing member similarly terminates in a second annular sealing lip of a generally frusto-conical configuration which projects axially and radially at an acute angle to the bearing axis and in the same axial direction as the first sealing lip. The inner lip is radially deflected and disposed in resilient sliding sealing contact with a cylindrical section of the other of the race members while the outer sealing lip is radially deflected and disposed in resilient sliding sealing contact with a chamfered surface formed on the outer end portion of the other race member. In accordance with a preferred embodiment of the present invention, the sealing lips of the double-lip seal in a free non-deflected condition, are disposed at an acute angle relative to the axis, or centerline, of the seal thereby providing for only a limited degree of deflection after assembly to reduce pressure and drag of the sealing members on the sealing surface and substantially improving their durability and operating life.

PRIOR ART STATEMENT

Seals including double-lips are shown, for example, in the United States of America U.S. Pat. Nos. 3,396,977; 3,519,316; 3,936,105; and 4,040,683. A triple-lip seal is shown in United States of American U.S. Pat. No. 3,989,259. These seals, however, do not disclose or suggest the unique features disclosed and claimed herein.

Additional benefits and advantages of the present invention will become apparent upon a reading of the description of the preferred embodiments taken in conjunction with the accompanying drawings.

BRIEF DESCRIPTION OF THE DRAWING

FIG. 1 is a front elevational view of a contoured double-lip bearing seal constructed in accordance with the preferred embodiment of the present invention;

FIG. 2 is a magnified fragmentary transverse sectional view of the bearing seal shown in FIG. 1 and taken substantially along the line 2—2 thereof; and FIG. 3 is a magnified fragmentary transverse sectional view illustrating the installed position of the bearing seal between the raceways of a ball bearing.

DESCRIPTION OF THE PREFERRED EMBODIMENTS

Referring now in detail to the drawing and as may be best seen in FIGS. 1 and 2 thereof, a contoured double-lip seal device in accordance with the preferred embodiments of the present invention comprises an annular reinforcing member 10 including a generally radially extending flange 12 integrally formed with an annular rim 14, extending continuously around one radial edge thereof. The flange 12 is preferably formed of a dish-shape cross section as shown in FIG. 2 and is provided with a generally frusto-conical inner portion which serves as a slinger of stones and foreign matter thereby serving as a protective shield of the two inner sealing members. The dish or concave configuration of the reinforcing member 10 also provides for increased axial clearance between the sealing members and the anti-friction elements of the bearing assembly providing for an increased reservoir of lubricant. The reinforcing member 10 may be comprised of any material of suitable strength and formability of which low alloy steel such as type 1010 are suitable for most applications.

An annular mass of a fluid resistant resilient material is suitably bonded or otherwise secured to the concave inner surface of the flange 12 and is integrally formed with a pair of axially spaced annular sealing members including an inner sealing member 16 and an outer sealing member 18. The inner sealing member 16 is formed having a permanent arcuate transverse configuration including a terminal sealing lip 20 which is of a generally frusto-conical configuration and projects radially and axially at an acute angle of approximately 15 to 25 degrees in a free non-deformed condition as shown in FIG. 2 relative to a central axis of the seal passing perpendicular to the place thereof. More specifically, the upper or base portion of the sealing member 16 is connected to the body of the seal member and is relatively stationary. The sealing lip 20 is flexibly joined to the base portion at an acute angle so that it extends radially inwardly and axially outwardly. The flexible connection permits a knee-action pivoting movement of the sealing lip 20 during installation of the seal.

The outer sealing member 18 also projects in a generally radial and axial direction terminating in an outer sealing lip 22 of a generally frusto-conical configureation which in the free non-deflected condition as shown in FIG. 2 intersects the axis of the seal at an acute angle of approximately 65 to 75 degrees and extends in the same axial direction as the inner sealing lip 20.

The mass of resilient material of which the inner and outer sealing members are comprised may be of any composition including natural and synthetic rubbers and plastics which are resilient to permit deflection of the sealing lips and which are compatible with and resistant to the lubricants and fluids with which they come into contact following installation in the bearing assembly. The resilient material including the two integrally formed sealing members can conveniently be produced by conventional molding practices employing a mold in which a preformed reinforcing washer is inserted so as to effect a simultaneous bonding of the resilient material to the washer forming an integral assembly. The sealing members employing standard molding practices can usually be molded in the exact configuration as illustrated in FIG. 2, necessitating only minimal trimming of any loose flash from the critical sealing portions including the end edges of the inner and outer sealing lips 20, 22.

The acute angle of inclination of the inner lip 20 and outer lip 22 when in a free non-deflected condition relative to the surface against which the sealing lips are adapted to be disposed after assembly can usually vary from about 10 degrees up to about 30 degrees depending on the material of which the sealing members are comprised. When oil resistant synthetic rubber compositions are employed, particularly satisfactory results have been obtained when the acute angle is maintained within a range of about 15 to about 25 degrees whereby only a relatively low angular deflection of the sealing lips is effected on installation, reducing the pressure and drag and resultant friction between the sealing lips and the surface being sealed.

Referring now to FIG. 3 of the drawing, a ball bearing assembly 28 is fragmentarily shown having a contoured double-lip seal installed in the annular gap between its relatively rotating outer race member 30 and inner race member 32 and axially spaced from a plurality of anti-friction elements such as ball bearings 34. It will be appreciated that the annular seal of the present invention is also suitable for use in bearing assemblies other than ball bearing assemblies including roller bearings, tapered roller bearings, needle bearings and the like. It is also contemplated that the double-lip seal can be installed on each side of the bearing assembly or only on one side with an alternative type seal on the opposite side, if desired, to achieve the appropriate sealing function.

In the exemplary embodiment illustrated in FIG. 3, the outer race member 30 is provided with an annular raceway 36 and the inner race member 32 is provided with an annular raceway 38 within a plurality of the ball bearings 34 are constrained. A suitable cage (not shown) can also be employed for maintaining the balls in appropriate circumferentially spaced position. The outer race member 30 is counter-bored forming an arcuate internal groove indicated at 40 in FIG. 3, adjacent to the outer edge thereof which is adapted to receive the peripheral portion of the reinforcing washer 10 after the rim 14 (FIG. 2) has been deformed such as by rolling or spinning to form a bead 42 disposed in firm seated engagement within the groove 40.

The inner race member 32 is formed with a generally circular cylindrical section 44 of substantially constant diameter extending from a position adjacent to the inner annular raceway 38 outwardly of the bearing and terminating at the intersection of chamfered surface 46 formed at the outer end portion of the inner race member. It will be appreciated that the cylindrical section 44 can also be provided with a taper in which event the angle of the inner sealing lip 20 is in a free non-deflected condition is correspondingly modified to provide the appropriate acute angle. Similarly, the chamfered surface 46 is illustrated in FIG. 3 at an angle of about 45 degrees but can be varied in consideration of the permissible axial width of the bearing assembly. Generally, chamber angles ranging from about 40 degrees to about 50 degrees are preferred.

It will be apparent from the configuration of the inner and outer sealing members in a free non-deflected condition as shown in FIG. 2, relative to the deflected position after installation as illustrated in FIG. 3, that the outward axial inclination of the sealing members assures appropriate orientation in an outward axial direction during installation such that the inner and outer sealing lips and their respective end edges 20, 22 are disposed in resilient sliding sealing contact against the surface of the cylindrical section and the chamfered surface, respectively, precluding entry of foreign or extraneous matter into the interior of the bearing assembly. This arrangement also permits the escape of any excess lubricant or grease from the bearing assembly during relubrication of the bearing and during the break-in period in which the anti-friction elements cut a path through the original grease packing thereby providing the requisite operating clearance.

It will be apparent from the description as hereinabove set forth in connection with the double-lip contoured bearing seal as illustrated in the drawing, that the seal arrangement is of a relatively axial compact configuration providing the advantages of a double-lip seal while further facilitating installation and providing for reduced pressure and drag of the sealing lips on the surfaces to be sealed, achieving thereby improved durability and increased operating life.

While it will be apparent that the invention herein disclosed is well calculated to achieve the benefits and advantages as hereinabove set forth, it will be appreciated that the invention is susceptible to modification, variation and change without departing from the spirit thereof.

What is claimed is:

1. A contoured double-lip seal comprising an annular reinforcing washer having a generally radially extending flange, an annular mass of a fluid resistant resilient material secured to said flange defining a seal body having first and second axially spaced annular sealing members, said first sealing member including an inwardly extending base portion connected to said seal body and a second portion flexibly joined to said base portion at an angle such that said second portion extends radially inwardly and axially outwardly, said second portion terminating in sealing lip, said second sealing member terminating in a second annular sealing lip of a frusto-conical configuration projecting axially and radially at an acute angle to the central axis of said seal and in the same axial direction as said first lip, said first and said second sealing members adapted to be resiliently deflected in a radial direction on installation around a cylindrical member to be sealed.

2. A double-lip seal as defined in claim 1 in which said first acute angle ranges from about 15 to about 25 degrees.

3. A double-lip seal as defined in claim 1 in which said second acute angle ranges from about 65 to about 75 degrees.

4. A double-lip seal as defined in claim 1 in which said washer further includes an annular rim extending around one edge thereof.

5. A double-lip seal as defined in claim 1 in which a portion of said flange of said washer is of a frusto-conical configuration.

6. A bearing assembly comprising first and second relatively rotatable race members and a plurality of anti-friction elements interposed therebetween and a contoured double-lip seal disposed in the annular gap between the race members at a position axially spaced from said anti-friction elements, said first race member formed with a chamfer around the end portion thereof and with a cylindrical section disposed between said chamfer and said anti-friction elements, said seal comprising an annular reinforcing washer having one radial edge portion thereof disposed in non-rotative engagement with said second race member, a mass of fluid resistant resilient material secured to the other radial edge portion defining a seal body having inner and outer axially spaced annular sealing members, said inner sealing member including an inwardly extending base portion connected to said seal body and a second portion flexibly joined to said base portion at an angle such that said second portion extends radially inwardly and axially outwardly, said second portion terminating in sealing lip, said inner lip when in the assembled position radially deflected by and resiliently biased in sliding sealing contact around said cylindrical section, said outer sealing member terminating in an outer sealing lip of a frusto-conical configuration projecting axially and radially in a free non-deflected condition at an acute angle to the surface of said chamfer and in the same axial direction as said inner lip, said second lip when in the assembled position radially deflected and resiliently biased in sliding sealing contact on said surface of said chamfer.

7. The bearing assembly as defined in claim 6 in which said acute angle of said inner lip in the free non-deflected condition ranges from about 15 to about 25 degrees.

8. The bearing assembly as defined in claim 6 in which said acute angle of said outer lip in the free non-deflected condition ranges from about 15 to about 25 degrees.

9. The bearing assembly as defined in claim 6 in which said chamfer is at an angle of about 40 to about 50 degrees relative to the axis of said bearing.

10. The bearing assembly as defined in claim 6 in which said cylindrical section is of a circular substantially constant diameter.

11. The bearing assembly as defined in claim 6 in which said second race member is formed with an annular groove for interlockingly receiving said one radial edge portion of said washer.

* * * * *